United States Patent Office 2,818,148
Patented Dec. 31, 1957

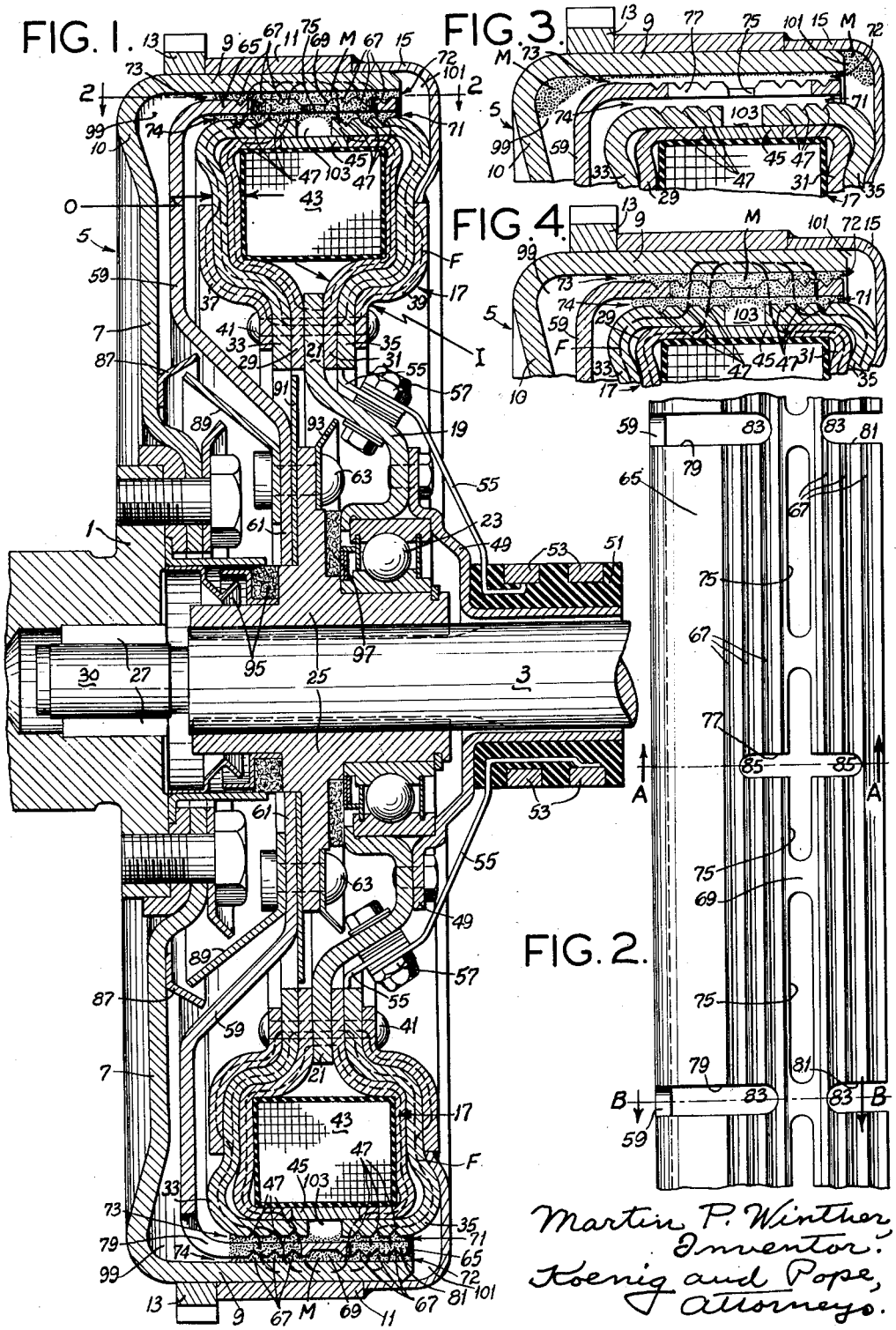

2,818,148

MAGNETIC FLUID CLUTCH WITH LAMINATED ROTOR

Martin P. Winther, Gates Mills, Ohio, assignor to Eaton Manufacturing Company, Cleveland, Ohio, a corporation of Ohio Application March 26, 1954, Serial No. 418,844

3 Claims. (Cl. 192—21.5)

This invention relates generally to a magnetic clutch of the type in which a finely divided fluent magnetic material of magnetically variable shear strength is employed as a variable connection in magnetic gaps between magnetic driving and driven members of the clutch, said strength varying as a magnetic field is varied, the magnetic material being movable from the gaps when the magnetic field is substantially completely deenergized.

The invention is an improvement upon the construction disclosed in the copending, coassigned United States patent application of Anthony Winther, Serial No. 262,779, filed December 21, 1951, now Patent No. 2,745,527, for Magnetic Clutch, hereinafter referred to as the first application, and the copending, coassigned United States patent application of Ralph L. Jaeschke, Serial No. 420,970, filed April 5, 1954, for Magnetic Clutch, hereinafter referred to as the second application.

Among the several objects of the invention may be noted the provision of a short, compact magnetic clutch, particularly (but without limitation) for automotive applications; the provision of a clutch of the class described which for a given torque transmission effects a weight reduction relative to the clutches shown in said applications; the provision of a clutch of the class described employing a single coil and one toroidal magnetic circuit having four magnetic gaps associated with one intermediate drum, thereby effecting structural simplification as well as said weight reduction; and the provision of a clutch of the class described, wherein a sufficient reduction is effected in the required cross section of the magnetic circuit so that the ferromagnetic field parts carrying this circuit may be formed as stampings which are convenient to form and assemble. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is an axial section of an energized clutch embodying my invention, wherein the section in the top half is on line A—A of Fig. 2, and the section in the bottom half is on line B—B of Fig. 2;

Fig. 2 is a fragmentary development illustrating the form of a ferromagnetic sleeve or drum as viewed on line 2—2 of Fig. 1;

Fig. 3 is a fragmentary detail section showing the position of certain finely divided ferromagnetic material when the filled clutch is deexcited and released; and, Fig. 4 is a view similar to Fig. 3, showing the position of said finely divided ferromagnetic material when the filled clutch is excited and transmitting torque.

Corresponding reference characters indicate corresponding parts throughout the several views of the drawings.

Referring now more particularly to Fig. 1, there is shown at numeral 1 a driver such as, for example, the flanged part of a crank shaft of an internal combustion engine. At numeral 3 is shown a driven shaft. Bolted to the driver 1 is the driving member of the clutch indicated in general by numeral 5. The member 5 includes a radial disc portion 7 and an outer peripheral ferromagnetic (steel) cylindric ring or rim 9. Elements 7 and 9 are preferably constituted by a single cup-shaped steel stamping. The junction 10 between 7 and 9 is made reentrant as shown. Surrounding cylinder 9 is a strengthening band 11 and an attached starter gear 13. Attached to members 9 and 11 (as by welding) is a nonmagnetic (for example, aluminum) cup-shaped ring 15. Ring 15 functions as a support for an inner field assembly 17 forming part of the driving member 5. This assembly is constituted by a stamped steel hub 19 incorporating a radial flange 21. Within the hub 19 is an antifriction bearing assembly 23, carried on a second hub 25, the latter being splined to the shaft 3. A pilot bearing 27 between a reduced end 30 of the shaft 3 and part 1 serves with bearing 23 to maintain coaxial rotary alignment between the driving and driven parts.

The field member 17 is formed by a pair of hat-shaped steel stampings 37, 39; and pairs of annularly grooved steel stampings 33, 35 and 29, 31. By the term "hat-shaped" is meant a form having offset outwardly and inwardly extending rims connected by an axial part from which they extend, as may be seen in Fig. 1. All of these are held together by rivets 41 passing through inner flanges as shown. The members 37 and 39 are preferably identical in shape, as are the members 33 and 35, and also the members 29 and 31. Members 29, 33 and 37, as also members 31, 35 and 39, are shaped to become nested so as to form field-containing laminations. They are circularly uninterrupted. The resulting two laminated nests 29, 33, 37 and 31, 35, 39, before assembly and riveting, receive between them an annular field coil 43 and a nonmagnetic spacer ring 45, the latter composed, for example, of aluminum or brass. After riveting, the assembly appears as in Fig. 1, wherein the coil 43 is held between two nests of parts 29, 33, 37 and 31, 35, 39. The ring 45 is abutted by the edges of outer pole-forming cylindric parts of members 29 and 31 and is overlapped by cylindric parts of members 33 and 35. The outer faces of the members 33 and 35 are grooved, as indicated at 47 for purposes now known in the art.

Attached to the hub 19 is a support 49 for an insulating spool 51, carrying slip rings 53 for brushes located in a suitable exciting circuit. The brushes and circuit are not shown, being known. Wires 55, attached by means of suitable supports 57, complete the circuit through the coil 43. Suitable openings (not shown) are employed for carrying the wires through the field assembly 17 to the coil 43.

The assembly thus far described may be referred to as the rotary driving or field assembly of the present clutch, being driven by the part 1. The driven assembly is constituted by a suitable annularly dished steel (ferromagnetic) stamping 59. Its central bulged portion 61 is held to the hub 25 by rivets 63. The outer cylindric rim or sleeve 65 of the part 59 is telescoped between the outer faces of members 33 and 35 and rim 9 of 7. This sleeve 65 has spaced groups of outer grooves 67 and a wider central groove 69. This construction establishes four spaced gaps 71, 72, 73 and 74. All of these gaps have a radial dimension on the order of 3/64 to 1/16 inch or so, although this is not to be taken as limiting.

In order to isolate the left-hand pair of gaps 73, 74 from the right-hand pair of gaps 71, 72, peripheral elongated slots or perforations 75 are provided in the sleeve 65. These, with groove 69, provide for increased magnetic reluctance in the central plane of sleeve 65 and therefore a substantial degree of magnetic isolation between the left- and right-hand ends of the sleeve.

Associated with every other one of the slots 75 are perforating cross slots 77. Additional perforating cross slots 79, which extend axially out through part 59 and perforating opposite marginal notches 81, are located in staggered relation to the cross slots 77. The cross slots 77, 79 and notches 81 are all axially positioned, although it is to be understood that some deviation in this respect may be tolerated. The adjacent ends 83 of slots 79 and notches 81 peripherally overlap the two ends 85 of slots 77. The slots 77, 79 and notches 81 are for the purpose of facilitating distribution of fluent magnetic material M, to be described below. In the case of a clutch having a mean diameter of a foot at sleeve 65, the number of repetitions of the pattern shown in Fig. 2 is eight, for example.

Labyrinth type conical deflectors 87 and 89, attached to parts 7 and 25, respectively, serve to seal off the space between parts 7 and 59. Labyrinth type conical deflectors 91 and 93, attached to the hub 25, serve to seal off the space between members 59 and 17, respectively. The rivets 63 hold in place the deflectors 89, 91 and 93. Additional guard seals for bearings 27 and 23 are shown at 95 and 97, respectively. The junction 10 between parts 7 and 9 where they join is shaped to provide an annular storage space 99. The nonmagnetic member 15 is also shaped to provide an annular storage space at 101.

A charge or fill of a fluent magnetic mixture M is carried in the space constituted by the gaps 71, 72, 73, 74 and storage spaces 99 and 101. The mixture may be any of those known to the art, which are flowable and of magnetically variable shear strength for closing magnetic gaps between relatively movable magnetic members when a magnetic field is energized. The magnetic material is movable from the gaps under centrifugal force substantially to clear them when the field is deenergized (Fig. 3). For example, a mixture of dry powdered finely divided iron may be used with a suitable finely divided additive such as graphite, as set forth in United States Patent 2,519,449. Another suitable mixture is one such as set forth in the copending, coassigned United States patent application of Ralph L. Jaeschke, Serial No. 393,180, filed November 19, 1953, for Magnetic Couplings, referred to herein as the third application. These materials are to be taken as illustrative and not limiting. The amount of the finely divided material is such that when the coil 43 is deexcited and the driving member 5 is rotating, the mixture under centrifugal force will seek a position of storage in the storage spaces 99 and 101, as illustrated in Fig. 3, escaping in part to these spaces through the passages 75, 77, 79 and 81 and in part directly from the gaps 71, 72, 73 and 74.

Upon exciting the coil 43, a toroidal magnetic field is set up, as illustrated by the dotted lines F in Figs. 1 and 4. This toroidally envelopes the coil 43 and loops through the gaps 71, 72, 73, 74. The field inductively magnetizes the finely divided magnetizable particles of material M, drawing them into the magnetic gaps 71, 72, 73, 74. It also affects the shear strength of the mass of material M. Axial and inward distribution of particles occurs quickly and evenly through the openings 75, 77, 79, 81. As stated in said second application, these openings preferably have lateral dimensions which are at least two times the thickness of the sleeve 65, so that magnetic fringing does not interfere with free movement of the material through the openings. Upon partial excitation, the field strength, being less than maximum, allows some shearing action to occur through the material M in its position such as shown in Fig. 4, so that the clutch operates to drive with rotary slip. Upon full excitation, the shear strength of the material M becomes of sufficient amount that the driving and driven members 5 and 17 are locked together for synchronous rotation under full-load driving conditions.

The nonmagnetic ring 45, space 103 between the members 33 and 35, and the peripheral groove 69 and slots 75, discourage short-circuiting of the toroidal flux field F, both across the members 33 and 35 and through the central portion of the ring 65. This forces most of the flux to be deflected twice through the ring 65 and across the four gaps 71, 72, 73 and 74, as shown.

A feature to be noted in the field construction is that the rims of the outer hat-shaped members 37 and 39 do not extend to the ends of the annularly dished members 29, 31, 33 and 35. Their inner crowns form additional inner flanges. Thus about the same circular section of material is obtained at a larger diameter such as at O, by means of the sections of only two members 29 and 33 (or 31 and 35), as is obtained at a smaller mean diameter such as at I through three members such as 31, 35 and 39 (or 29, 33, 37). Therefore, a condition of approximately constant flux density is carried in all of the circular sections of the magnetic material toroidally enveloping the coil. Stated otherwise, the iron in the flux toroidal circuit is very efficiently used, which minimizes the amount of it required. Consequently, weight is minimized. In fact, the weight is sufficiently minimized to allow parts 29, 31, 33, 35, 37, 39 to be manufactured as stampings, which would otherwise not be practicable.

Another advantage of the invention is that the length of the magnetic circuit is kept to a minimum although four magnetic gaps are included in it. This is because these gaps are associated with the single telescoping sleeve 65, rather than several of these, as has been proposed in said first application. Moreover, the four gaps are supplied with flux from a single coil. While for a given capacity this coil needs to be made larger than a single-coil clutch having two gaps, its ampere turns and weight need not be doubled to have the same capacity as two single-coil machines or the equivalent, each having two gaps associated with one intermediate telescoping sleeve. And the distance that the magnetic material needs to travel from storage spaces such as 99 and 101 to emplacement in driving condition within four gaps such as 71, 72, 73 and 74, is considerably reduced. As a result, the clutch will be more rapidly coupled or released upon excitation and deexcitation. The increased reluctance of the four gaps operative in series also favors quick release by reducing the amount of residual magnetism of the magnetic circuit.

It will be understood that, while the preferred form of the device is one in which the parts attached to member 1 are the driving parts and those attached to shaft 3 are the driven parts, under some circumstances this driving and driven arrangement may be reversed; also, the inside and outside relationship of the field parts and cylinder 9 relative to sleeve 65 may be reversed; each without change in the principles of invention involved.

Regarding the slots 77, 79 and notches 81, their stated widths of not less than twice the thickness of the sleeve 65 are for the purpose of obtaining rapid entry of the magnetic material into the gaps upon excitation and rapid exit of the material upon deexcitation. While it is preferable that the slots 75 also be of such width, this is optional, since they are not primarily for the purpose of improving free movement of the material M, although they aid in this respect. As above shown, they are for the purpose of preventing any substantial short-circuiting of the magnetic circuit F through the sleeve 65 which would render less effective the magnetization in gaps 72 and 73.

The term clutch as used herein includes brakes, which are clutches wherein one of the relatively rotary members is held stationary.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:
1. A field member for electric clutches comprising an annular field coil, annularly grooved dished ferromagnetic steel stampings, each enveloping the outside, inside and one end of the coil, both stampings being formed to provide peripherally continuous axially spaced outside pole-forming rings and radial flanges which are inside of the coil, and means for holding together said radial flanges.

2. A field member for electric clutches comprising an annular field coil, groups of nested annularly grooved dished ferromagnetic steel stampings, said groups respectively enveloping the outside, inside and respective ends of the coil to provide laminated peripherally continuous axially spaced outside pole-forming rings and radial flanges which are inside of the coil, and means for holding together said radial flanges.

3. A field member for electric clutches comprising an annular field coil, groups of nested annularly grooved dished ferromagnetic steel stampings, said groups respectively enveloping the outside, inside and respective ends of the coil to provide laminated peripherally continuous axially spaced outside pole-forming rings and radial flanges which are inside of the coil, additional ferromagnetic stampings, each additional stamping having an axial part connecting offset outwardly and inwardly extending rims, each such additional stamping being nested externally with one of said groups, said outwardly extending rims lying opposite the sides of the coil and said inwardly extending rims forming additional inside radial flanges, whereby a condition of approximately constant density of flux from the coil may be maintained in all of the circular sections of the ferromagnetic material toroidally enveloping the coil, and means for fastening said inside flanges.

References Cited in the file of this patent
UNITED STATES PATENTS

| 2,243,318 | Rawlings | May 27, 1941 |
| 2,663,809 | Winslow | Dec. 22, 1953 |

FOREIGN PATENTS

| 976,917 | France | Nov. 1, 1950 |
| 1,013,159 | France | Apr. 30, 1951 |

OTHER REFERENCES

Technical Report 1213—National Bureau of Standards, Mar. 30, 1948.

Magnetic Powder Clutch Servo—Radio and Television News, September 1950.

The Magnetic Fluid Clutch—The Engineer, Feb. 23, 1951.